United States Patent Office 3,803,314
Patented Apr. 9, 1974

3,803,314
PHARMACEUTICAL COMPOSITIONS AND USE OF N-ALKYL-1,4-DIHYDROPYRIDINES
Friedrich Bossert, Elberfeld, and Wulf Vater, Opladen, Germany, assignors to Bayer Aktiengesellschaft, Leverkusen, Germany
No Drawing. Continuation-in-part of abandoned application Ser. No. 168,444, Aug. 2, 1971, which is a division of application Ser. No. 880,946, Nov. 28, 1969, now Patent No. 3,647,807. This application Mar. 23, 1973, Ser. No. 344,097
Claims priority, application Germany, Dec. 7, 1968, P 18 13 436.6
Int. Cl. A61k 27/00
U.S. Cl. 424—263    38 Claims

ABSTRACT OF THE DISCLOSURE

Pharmaceutical compositions employing novel 1,4-dihydropyridine derivatives are described as well as their use as coronary dilators, hypotensive agents and spasmolytics. A representative composition is one employing 1,2,6-trimethyl-4-(α-pyridyl) - 1,4 - dihydropyridine-3,5-dicarboxylic acid dimethyl ester.

CROSS REFERENCE

This is a continuation in part of U.S. Ser. No. 168,444, filed Aug. 2, 1971, now abandoned, which in turn is a division of Ser. No. 880,946, filed Nov. 28, 1969, now U.S. Pat. No. 3,647,807.

It is known that increasingly strong and serious disturbances of the coronary blood supply can lead to diseases of the circulatory system such as coronary insufficiency, especially angina pectoris which is painful and often progressively grave. Conventional commercial preparations such as nitrites or nitroglycerin while helpful have not always provided alleviation or satisfactory treatment and although they are widely used they have recognized limitations and disadvantages. There has therefore been numerous attempts to find better preparations without much success. It is the object of this invention to pronew and better preparations which in animal tests have shown good ability to cause coronary artery dilation at low dosage. The new compounds also possess spasmolytic activity and the compositions can thus be used in the treatment of muscle spasms.

It has been found according to the present invention that 1,4-dihydropyridine derivatives of the formula:

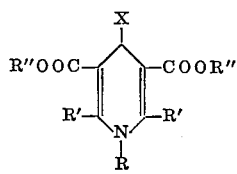

in which

R is branched or straight-chain alkyl with 1 to 3 carbon atoms; or such alkyl containing a double or triple bond or substituted by hydroxy or alkoxy; benzyl; or substituted in the nucleus by one or more of the substituents halogen, alkyl or alkoxy;
R' is hydrogen or branched or straight-chain alkyl with 1 to 3 carbon atoms;
R" is branched or straight-chain, saturated alkyl with 1 to 4 carbon atoms, or such alkyl interrupted by oxygen or substituted by hydroxyl; and
X is phenyl substituted by at least one nitro or amino group or further substituted by halogen, alkyl, alkoxy or hydroxy, or α-, β- or γ-pyridyl have therapeutic properties which are very valuable for the beneficial treatment of disturbances of the coronary blood supply.

After intravenous or oral application, the new compounds or in pharmaceutical compositions, give rise to a noticeably persistent dilation of the coronary vessels and in this respect they are superior to comparable or available commercial products. The new compounds also have good spasmolytic properties. They are formulated for use with conventional carriers.

The new compounds are prepared as described in U.S. Pat. No. 3,647,807, the disclosure of which is hereby incorporated by reference.

The most important pharmacological data are given below for a representative compound which is characteristic of all the compounds, 1,2,6-trimethyl-4-(α-pyridyl)-1,4-dihydropyridine-3,5-dicarboxylic acid dimethyl ester.

Toxicity: DL 50, mice i.v., 79.7 mg./kg.; mice p.o., approx., 300.0 mg./kg.; mice i.p., approx., 210.0 mg./kg.

Blood pressure in rats: Strong increase of blood pressure with 10 mg./kg. i.v. The initial value was not yet reached again after 20 minutes. Reduced adrenaline effect.

Coronary effect in dogs (heart catheterized):
 Oxygen pressure: Narcosis: urethane-chloralose; strong increase with 50 mg./kg. p.o.; return to initial value after 5 hours.
 Oxygen saturation: Narcosis: phanodorm; in three experiments slight increase with 3 mg./kg. i.v.; the initial value was not yet reached again after 3½ hours; in eight experiments slight to marked increase with 5 mg./kg.; in four experiments the initial value was again reached after 3 hours, in four experiments it was not yet reached after 4 hours.
Blood pressure (dogs): Slight variations.
Frequency (dogs): No appreciable change.

The invention is illustrated by the following non-limitative examples.

EXAMPLE 1

(1) 1,2,6-trimethyl-4-(2'-nitrophenyl) - 1,4 - dihydropyridine-3,5-dicarboxylic acid dimethyl ester.—2-nitrobenzaldehyde, 30 ml. of acetoacetic acid methyl ester and 6 ml. of a solution of methylamine in 100 ml. of methanol are heated under reflux for several hours, the mixture is filtered after the addition of animal charcoal, cooled, and 12 g. of yellow crystals of M.P. 168° to 170° C. are obtained after filtering off with suction.

Coronary dilating effect obtained with 0.5 mg./kg. i.v., and 5 mg./kg. p.o.:

(a) Melting point of the diethyl ester 131° to 134° C.; coronary dilating effect obtained with 0.02 to 2 mg./kg. i.v.; good spasmolytic effect.
(b) melting point of the β-hydroxydiethyl ester 110° C.;
(c) 1-ethyl - 2,6 - dimethyl-4-(2'-nitrophenyl)-1,4-dihydropyridine-3,5-dicarboxylic acid dimethyl ester, M.P. 146° C.

(2) After oxidation of the 2,6-dimethyl-4-(2'-nitrophenyl)-1,4-dihydropyridine-3,5-dicarboxylic acid diethyl ester (M.P. 124° C.) with dilute nitric acid or sodium nitrite in glacial acetic acid to form the 2,6-dimethyl-4-(2'-nitrophenyl)-pyridine-3,5-dicarboxylic acid diethyl ester (M.P. 93° to 94° C., benzene/ligroin), the oxidation product is quaternized by prolonged heating with dimethyl sulphate in a water bath, and the quaternary ammonium compound is subsequently reduced with a solution of sodium hydrosulphite in water to form the 1,2,6-trimethyl-4-(2'-nitrophenyl)-1,4-dihydropyridine - 3,5 - dicarboxylic acid diethyl ester of M.P. 133° C.

EXAMPLE 2

1,2,6-trimethyl - 4 - (3'-nitrophenyl)-1,4-dihydropyridine-3,5-dicarboxylic acid diethyl ester.—A solution of 15 g. of 3-nitrobenzaldehyde, 30 g. of α-methylamino-crotonic acid ethyl ester in 200 ml. of glacial acetic acid is heated under reflux for one hour, then poured into water and allowed to stand overnight; 25 g. of pale yellow crystals of M.P. 95° C. are obtained from methanol.

The compound obtained in the same way with 4-nitrobenzaldehyde melts at 95° C.; coronary dilating effect obtained with 0.1 to 1.0 mg./kg. i.v.

The following compounds were similarly prepared:

(a) 1,2,6-trimethyl - 4 - (4'-nitrophenyl)-1,4-dihydropyridine-3,5-dicarboxylic acid methyl ester of M.P. 160° C.; coronary dilating effect with 5 mg./kg. i.v.
(b) 1,2,6-trimethyl - 4 - (3'-nitrophenyl)-1,4-dihydropyridine-3,5-dicarboxylic acid di-(β-propoxyethyl ester) of M.P. 54° C.; coronary effect with 1 mg./kg. i.v.
(c) 1,2,6-trimethyl - 4 - (2'-nitrophenyl)-1,4-dihydropyridine-3,5-dicarboxylic acid di-(β-propoxyethyl ester) (oil); coronary effect with 1 to 3 mg./kg. i.v.
(d) 1-isopropyl-2,6-dimethyl - 4 - (2'-nitrophenyl)-1,4-dihydropyridine-3,5-dicarboxylic acid dimethyl ester of M.P. 187° C.; coronary effect with 3 mg./kg. i.v.

EXAMPLE 3

1-benzyl-2,6-dimethyl - 4 - (3'-nitro-6-chloro)-1,4-dihydropyridine-3,5-dicarboxylic acid diethyl ester.—185 g. (1 mol) of 3-nitro-6-chloro-benzaldehyde are heated with 270 ml. of acetoacetic acid ethyl ester and 107 g. of benzylamine in 400 ml. of alcohol at boiling temperature overnight, the mixture is suction-filtered, and after prolonged standing there are obtained 246 g. of yellow crystals of M.P. 120° to 122° C.; brief coronary dilating effect obtained with 3 to 10 mg./kg. i.v.

The 1-benzyl-2,6-dimethyl - 4 - (4'-nitrophenyl)-1,4-dihydropyridine-3,5-dicarboxylic acid diethyl ester of M.P. 100° to 102° C. is obtained in the same way (golden yellow crystals); brief coronary dilating effect obtained with 1 to 10 mg./kg. i.v.

EXAMPLE 4

1-benzyl-2,6-dimethyl - 4 - (4'-aminophenyl)-1,4-dihydropyridine-3,5-dicarboxylic acid diethyl ester.—After heating 120 g. of 1-benzyl-2,6-dimethyl-4-(4'-nitrophenyl)-1,4-dihydropyridine-3,5-dicarboxylic acid diethyl ester (M.P. 100° to 102° C.) in 400 ml. of water and 400 ml. of chlorobenzene with the addition of 400 g. of iron shavings and 6 ml. of glacial acetic acid for 8 hours, the mixture is filtered with suction, the chlorobenzene layer is separated and the chlorobenzene distilled off in a vacuum. From the residue there are obtained, after recrystallization from acetone/ether, pale-yellow crystals of M.P. 173° to 175° C.

Coronary dilating effect obtained with 10 to 20 mg./kg. i.v.

The same compound is also obtained by catalytic reduction with Raney nickel in ethanol.

EXAMPLE 5

1-(β-hydroxyethyl)-2,6-dimethyl - 4 - (γ-pyridyl)-1,4-dihydropyridine-3,5-dicarboxylic acid diethyl ester.—A solution of 21.4 g. of γ-pyridinaldehyde and 12 ml. of 1-aminoethanol-2 in 52 ml. of acetoacetic acid ethyl ester and 50 ml. of methanol is heated at boiling temperature for several hours, filtered and cooled. After filtering off with suction and washing with ether, white crystals (30 g.) of M.P. 165° C. are obtained. Brief coronary dilating effect obtained with 20 mg./kg. i.v.

1-(β-hydroxyethyl)-2,6-dimethyl - 4 - (β-pyridyl)-1,4-dihydropyridine-3,5-dicarboxylic acid diethyl ester, M.P. 158° C.; coronary dilating effect obtained with 10 to 20 mg./kg. i.v.

EXAMPLE 6

1 - benzyl-2,6-dimethyl - 4 - (α-pyridyl)-1,4-dihydropyridine-3,5-dicarboxylic acid diethyl ester.—21.4 g. of pyridine-2-aldehyde, 52 ml. of acetoacetic ester and 22.6 g. of benzylamine are heated in 60 ml. of methanol at boiling temperature overnight, the mixture is poured into water, extracted with ether and the extract washed with a sodium chloride solution.

After distilling off the ether, there are obtained 24 g. of white crystals of M.P. 112° C. (benzene/ligroin). The 1-benzyl-2,6-dimethyl - 4 - (α-pyridyl)-1,4-dihydropyridine-3,5-dicarboxylic acid dimethyl ester melts at 180° C. (HCl salt).

(a) The corresponding di-tert.-butyric acid ester melts at 166° C.; coronary dilating effect obtained with 3 to 5 mg./kg. i.v.;
(b) 1-benzyl-2,6-dimethyl - 4 - (γ-pyridyl)-1,4-dihydropyridine-3,5-dicarboxylic acid dimethyl ester, M.P. 182° C.;
(c) diethyl ester, M.P. 198° C.; coronary dilating effect obtained with 15 mg./kg. i.v.;
(d) isopropyl ester, M.P. 146° C.; coronary dilating effect obtained with 10 to 20 mg./kg. i.v.

EXAMPLE 7

1-(3',4'-dimethoxybenzyl)-2,6-dimethyl - 4 - (β-pyridyl)-1,4-dihydropyridine-3,5-dicarboxylic acid diethyl ester.—After heating a solution of 10.7 g. of pyridinaldehyde, 16.7 g. of 3,4-dimethoxy-benzylamine and 26 ml. of acetoacetic acid ethyl ester in 25 ml. of alcohol for several hours, the mixture is concentrated by evaporation in a vacuum, the residue taken up with acetone/ether, and the reaction product precipitated as the HCl salt. After recrystallizing twice (from acetone, then from alcohol), there are obtained yellow crystals (30 g.) of M.P. 179° to 181° C.; coronary dilating effect obtained with 5 mg./kg. i.v.

EXAMPLE 8

1,2,6 - trimethyl - 4-(2'-aminophenyl)-1,4-dihydro-pyridine-3,5-dicarboxylic acid dimethyl ester.—50 g. of 1,2,6-trimethyl - 4-(2'-nitrophenyl)-1,4-dihydropyridine-3,5-dicarboxylic acid methyl ester are reduced in 500 ml. of methanol in the presence of 10 g. of Raney nickel under hydrogen (in a pressure autoclave at 70° to 80° C.), the mixture is suction-filtered when the absorbption of hydrogen is terminated (1½ to 2 hours), and after cooling there are obtained 24 g. of pale yellow crystals of M.P. 191° C. Brief coronary dilating effect obtained with 5 mg./kg. i.v.

The 1,2,6 - trimethyl-4-(3'-aminophenyl)-1,4-dihydropyridine-3,5-dicarboxylic acid diethyl ester has a M.P. of 134° to 136° C.; coronary dilating effect obtained with 5 to 10 mg./kg. i.v.

EXAMPLE 9

1,2,6 - trimethyl - 4-(3'-nitro-4'-hydroxyphenyl)-1,4-dihydropyridine - 3,5-dicarboxylic acid diethyl ester.—After heating 8.5 g. of 3-nitro-4-hydroxy-benzaldehyde, 15 ml. of acetoacetic acid ethyl ester and 6 ml. of a 30% to 40% aqueous methylamine solution in 50 ml. of alcohol for several hours, concentrating the mixture by evaporation and adding ether, there are obtained 7 g. of yellow crystals of M.P. 142° C.; coronary dilating effect obtained with 3 mg./kg. i.v.

In the same way there were obtained:

(a) 1,2,6 - trimethyl - 4-(2'-nitro-5'-hydroxyphenyl)-1,4-dihydropyridine-3,5-dicarboxylic acid dimethyl ester of M.P. 237° C.; coronary dilating effect obtained with 3 to 10 mg./kg. i.v.
(b) 1,2,6 - trimethyl - 4-(2'-nitro-5'-hydroxyphenyl)-1,4-dihydropyridine-,3,5-dicarboxylic acid diethyl ester of M.P. 197° C.; coronary dilating effect obtained with 10 mg./kg. i.v.

(c) 1,2,6 - trimethyl - 4 - (4'-nitro-3'-hydroxyphenyl)-1,4-dihydro-pyridine-3,5-dicarboxylic acid dimethyl ester of M.P. 187° C.; coronary dilating effect obtained with 10 mg./kg. i.v.

(d) 1,2,6 - trimethyl - 4-(4'-nitro-3'-hydroxyphenyl)-1,4-dihydropyridine-3,5-dicarboxylic acid diethyl ester of M.P. 151° C.; coronary dilating effect obtained with 10 mg./kg. i.v.

EXAMPLE 10

1,2,6 - trimethyl - 4 - (α-pyridyl)-1,4-dihydropyridine-3,5-dicarboxylic acid dimethyl ester.—After heating a solution of 20 ml. of pyridine-2-aldehyde, 50 ml. of acetoacetic acid methyl ester and 30 ml. of a 30% to 40% aqueous solution of methylamine in 100 ml. of methanol under reflux for 2 to 3 hours, the mixture is filtered with suction through animal charcoal and concentrated to half its volume. After the addition of ether and cooling, 5 g. of pale yellow crystals are obtained; white crystals of M.P. 160° to 162° C. from methanol.

The following compounds were also prepared:

(a) 1,2,6 - trimethyl - 4-(α-pyridyl)-1,4-dihydropyridine-3,5-dicarboxylic acid diethyl ester of M.P. 106° C.; coronary dilating effect obtained with 1 to 2 mg./kg. i.v.

(b) 1,2,6 - trimethyl - 4-(β-pyridyl)-1,4-dihydropyridine-3,5-dicarboxylic acid dimethyl ester of M.P. 190° C. (HCl salt); brief coronary dilating effect obtained with 3 to 5 mg./kg. i.v.

(c) N - isopropyl - 2,6-dimethyl-4-(α-pyridyl)-1,4-dihydropyridine-3,5-dicarboxylic acid dimethyl ester of M.P. 131° C.

(d) N - allyl - 2,6-dimethyl-4-(α-pyridyl)-1,4-dihydropyridine-3,5-dicarboxylic acid dimethyl ester of M.P. 106° C.; brief coronary dilating effect obtained with 2 mg./kg. i.v.

(e) 1,2,6 - trimethyl - 4-(α-pyridyl)-1,4-dihydropyridine-3,5-dicarboxylic acid diisopropyl ester of M.P. 115° C.; coronary dilating effect obtained with 2 mg./kg. i.v.

(f) 1,2,6 - trimethyl - 4-(α-pyridyl)-1,4-dihydropyridine-3,5-dicarboxylic acid-di-(β-methoxyethyl-ester) of M.P. 108° C.; coronary dilating effect obtained with 3 to 5 mg./kg. i.v.

(g) 1,2,6 - trimethyl - 4-(β-pyridyl)-1,4-dihydropyridine-3,5-dicarboxylic acid-di-(β-propoxyethyl-ester) of M.P. 58° C.; coronary dilating effect obtained with 1 to 2 mg./kg. i.v.

(h) 1,2,6 - trimethyl - 4-(α-pyridyl)-1,4-dihydropyridine-3,5-dicarboxylic acid-di-(β-propoxyethyl-ester) of M.P. 88° C.; coronary dilating effect obtained with 2 to 3 mg./kg. i.v.

EXAMPLE 11

Pharmaceutical compositions are prepared so as to contain a major or minor amount, e.g. from 95 to 0.5%, of at least one dihydropyridine as herein defined in combination with a pharmaceutical carrier, the carrier comprising one or more solid, semisolid or liquid diluent, filler and formulation adjuvant which is nontoxic, inert and pharmaceutically acceptable. Such pharmaceutical compositions are preferably in dosage unit form; i.e. physically discrete units containing a predetermined amount of the drug corresponding to a fraction or multiple of the dose which is calculated to produce the desired therapeutic response. The dosage units can contain one, two, three, four or more single doses or, alternatively, one-half, third or fourth of a single dose. A single dose preferably contains an amount sufficient to produce the desired therapeutic effect upon administration at one application of one or more dosage units according to a predetermined dosage regimen, usually a whole, half, third or quarter of the daily dosage administered once, twice, three or four times a day. Other therapeutic agents can also be present.

Although the dosage and dosage regimen must in each case be carefully adjusted, utilizing sound professional judgment and considering the age, weight and condition of the recipient, the route of administration and the nature and gravity of the illness, generally the daily dose will be from about 0.01 to about 10 mg./kg. In some instances a sufficient therapeutic effect can be obtained at a lower dose while in others, a larger dose will be required.

Oral administration can be effected utilizing solid and liquid dosage unit forms such as powders, tablets, dragees, capsules, granulates, suspensions, solutions and the like.

Powders are prepared by comminuting the compound to a suitable fine size and mixing with a similarly comminuted pharmaceutical carrier such as an edible carbohydrate as for example starch, lactose, sucrose, glucose or mannitol. Sweetening, flavoring, preservative, dispersing and coloring agents can also be present.

Capsules are made by preparing a powder mixture as described above and filling formed gelatin sheaths. Glidants and lubricants such as colloidal silica, talc, magnesium stearate, calcium stearate or solid polyethylene glycol can be added to the powder mixture before the filling operation. A disintegrating or solubilizing agent such as agar-agar, calcium carbonate or sodium carbonate can also be added to improve the availability of the medicament when the capsule is ingested.

Tablets are formulated for example by preparing a powder mixture, granulating or slugging, adding a lubricant and disintegrant and pressing into tablets. A powder mixture is prepared by mixing the compound, suitably comminuted, with a diluent or base as described above, and optionally with a binder such as carboxymethyl cellulose, an alginate, gelatin, or polyvinyl pyrrolidone, a solution retardant such as paraffin, a resorption accelerator such as a quaternary salt and/or an absorption agent such as bentonite, kaolin or dicalcium phosphate. The powder mixture can be granulated by wetting with a binder such as syrup, starch paste, acacia mucilage or solutions of cellulosic or polymeric materials and forcing through a screen. As an alernative to granulating, the powder mixture can be run through the tablet machine and the resulting imperfectly formed slugs broken into granules. The granules can be lubricated to prevent sticking to the tablet forming dies by means of the addition of stearic acid, a stearate salt, talc or mineral oil. The lubricated mixture is then compressed into tablets. The medicaments can also be combined with free flowing inert carriers and compressed into tablets directly without going through the granulating or slugging steps. A clear or opaque protective coating consisting of a sealing coat of shellac, a coating of sugar or polymeric material and a polish coating of wax can be provided. Dyestuffs can be added to these coatings to distinguish different unit dosages.

Oral fluids such as solutions, syrups and elixirs can be prepared in dosage unit form so that a given quantity contains a predetermined amount of the compound. Syrups can be prepared by dissolving the compound in a suitably flavored aqueous sucrose solution while elixirs are prepared through the use of a nontoxic alcoholic vehicle. Suspensions can be formulated by dispersing the compound in a nontoxic vehicle. Solubilizers and emulsifiers such as ethoxylated isostearyl alcohols and polyoxyethylene sorbitol esters, preservatives, flavor additives such as peppermint oil or saccharin, and the like can also be added.

Where appropriate, dosage unit formulations for oral administration can be microencapsulated. The formulation can also be prepared to prolong or sustain the release as for example by coating or embedding particulate material in polymers, wax or the like.

Parenteral administration can be effected utilizing liquid dosage unit forms such as sterile solutions and suspensions intended for subcutaneous, intramuscular or intravenous injection. These are prepared by suspending or dissolving a measured amount of the compound in a nontoxic liquid vehicle suitable for injection such as an aqueous or oleaginous medium and sterilizing the suspension or solution. Alternatively a measured amount of the compound is placed in a vial and the vial and its contents are sterilized and sealed. An accompanying vial or vehicle can be provided for mixing prior to administration. Nontoxic salts and salt solutions can be added to render the injection isotonic. Stabilizers, preservatives and emulsifiers, can also be added.

Rectal administration can be effected utilizing suppositories in which the compound is admixed with low melting water soluble or insoluble solids such as polyethylene glycol, cocoa butter, higher esters as for example myristyl palmitate, or mixtures thereof.

The foregoing examples of pharmaceutical compositions can utilize each of the individual compounds recited in Examples 1–10.

What is claimed is:
1. A pharmaceutical composition for use in the dilation of coronary arteries and the treatment of spasms comprising an effective amount of a compound of the formula:

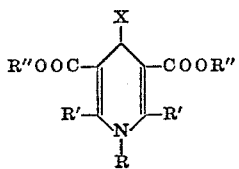

in which
R is a branched or straight-chain alkyl with 1 to 3 carbon atoms, or such alkyl having a double or triple bond or substituted by hydroxy or alkoxy, benzyl, or benzyl substituted in the nucleus by one or more of the substituents halogen, alkyl, alkoxy;
R' is hydrogen or branched or straight-chain alkyl with 1 to 3 carbon atoms;
R" is branched or straight-chain, saturated alkyl with 1 to 4 carbon atoms, or such alkyl interrupted by oxygen or substituted by hydroxyl; and
X is phenyl substituted by at least one nitro or amino group or further substituted by halogen, alkyl, alkoxy or hydroxy, or $\alpha$-, $\beta$- or $\gamma$-pyridyl,
and a pharmaceutical carrier.

2. A composition according to claim 1 wherein said compound is 1,2,6-trimethyl-4-(2'-nitrophenyl)-1,4-dihydropyridine 3,5-dicarboxylic acid diethyl ester.

3. A composition according to claim 1 wherein said compound is 1,2,6-trimethyl-4(3'-nitrophenyl)-1,4-dihydropyridine-2,5-dicarboxylic acid diethyl ester.

4. A composition according to claim 1 wherein said compound is 1,2,6-trimethyl-4-(2'-nitrophenyl)-1,4-dihydropyridine-3,5-dicarboxylic acid di-($\beta$-hydroxyethyl) ester.

5. A composition according to claim 1 wherein said compound is 1-ethyl-2,6-dimethyl-4-(2'-nitrophenyl)-1,4-dihydropyridine-3,5-dicarboxylic acid dimethyl ester.

6. A composition according to claim 1 wherein said compound is 1,2,6-trimethyl-4-(3'-nitrophenyl)-1,4-dihydropyridine-3,5-dicarboxylic acid diethyl ester.

7. A composition according to claim 1 wherein said compound is 1,2,6 - trimethyl - 4 - (4' - nitrophenyl)-1,4-dihydropyridine-3,5-dicarboxylic acid methyl ester.

8. A composition according to claim 1 wherein said compound is 1,2,6 - trimethyl - 4 - (3' - nitrophenyl)-1,4-dihydropyridine-3,5,-dicarboxylic acid di-($\beta$-propoxyethyl ester).

9. A composition according to claim 1 wherein said compound is 1,2,6 - trimethyl - 4 - (2' - nitrophenyl)-1,4-dihydropyridine-3,5-dicarboxylic acid di-($\beta$-propoxyethyl ester).

10. A composition according to claim 1 wherein said compound is 1 - isopropyl - 2,6 - dimethyl - 4 - (2'-nitrophenyl)-1,4-dihydropyridine - 3,5 - dicarboxylic acid dimethyl ester.

11. A composition according to claim 1 wherein said compound is 1 - benzyl - 2,6 - dimethyl - 4 - (3'-nitro-6-chloro) - 1,4 - dihydropyridine - 3,5 - dicarboxylic acid diethyl ester.

12. A composition according to claim 1 wherein said compound is 1 - benzyl - 2,6 - dimethyl - 4 - (4' - nitrophenyl) - 1,4 - dihydropyridine - 3,5 - dicarboxylic acid diethyl ester.

13. A composition according to claim 1 wherein said compound is 1 - benzyl - 2,6 - dimethyl - 4 -(4' - aminophenyl) - 1,4 - dihydropyridine - 3,5 - dicarboxylic acid diethyl ester.

14. A composition according to claim 1 wherein said compound is 1 - ($\beta$ - hydroxyethyl) - 2,6 - dimethyl-4-($\gamma$-pyridyl) - 1,4 - dihydropyridine - 3,5 - dicarboxylic acid diethyl ester.

15. A composition according to claim 1 wherein said compound is 1 - ($\beta$ - hydroxyethyl) - 2,6 - dimethyl-4-($\beta$ - pyridyl) - 1,4 - dihydropyridine-3,5-dicarboxylic acid diethyl ester.

16. A composition according to claim 1 wherein said compound is 1 - benzyl - 2,6 - dimethyl - 4 - ($\alpha$-pyridyl)-1,4 - dihydropyridine - 3,5 - dicarboxylic acid diethyl ester.

17. A composition according to claim 1 wherein said compound is 1 - benzyl - 2,6 - dimethyl - 4 - ($\alpha$-pyridyl)-1,4 - dihydropyridine - 3,5 - dicarboxylic acid di-tert.-butyric acid ester.

18. A composition according to claim 1 wherein said compound is 1 - benzyl - 2,6 - dimethyl - 4 - ($\gamma$-pyridyl)-1,4 - dihydropyridine - 3,5 - dicarboxylic acid dimethyl ester.

19. A composition according to claim 1 wherein said compound is 1 - benzyl - 2,6 - dimethyl - 4 - ($\gamma$-pyridyl)-1,4 - dihydropyridine - 3,5 - dicarboxylic acid diethyl ester.

20. A composition according to claim 1 wherein said compound is 1 - benzyl - 2,6 - dimethyl - 4 - ($\gamma$-pyridyl)-1,4-dihydropyridine - 3,5 - dicarboxylic acid isopropyl ester.

21. A composition according to claim 1 wherein said compound is 1 - (3',4' - dimethoxybenzyl)-2,6-dimethyl-4 - ($\beta$ - pyridyl) - 1,4 - dihydropyridine-3,5-dicarboxylic acid diethyl ester.

22. A composition according to claim 1 wherein said compound is 1,2,6 - trimethyl - 4 - (2' - aminophenyl)-1,4-dihydropyridine-3,5-dicarboxylic acid dimethyl ester.

23. A composition according to claim 1 wherein said compound is 1,2,6 - trimethyl - 4 - (3' - aminophenyl)-1,4 - dihydropyridine - 3,5 - dicarboxylic acid diethyl ester.

24. A composition according to claim 1 wherein said compound is 1,2,6 - trimethyl - 4 - (3' - nitro-4'-hydroxyphenyl) - 1,4 - dihydropyridine - 3,5 - dicarboxylic acid diethyl ester.

25. A composition according to claim 1 wherein said compound is 1,2,6 - trimethyl - 2 - (2' - nitro-5'-hydroxyphenyl) - 1,4 - dihydropyridine - 3,5 - dicarboxylic acid dimethyl ester.

26. A composition according to claim 1 wherein said compound is 1,2,6 - trimethyl - 4 - (2' - nitro-5'-hydroxyphenyl) - 1,4 - dihydropyridine - 3,5 - dicarboxylic acid diethyl ester.

27. A composition according to claim 1 wherein said compound is 1,2,6 - trimethyl - 4 - (4' - nitro - 3'-hydroxyphenyl) - 1,4 - dihydropyridine - 3,5 - dicarboxylic acid dimethyl ester.

28. A composition according to claim 1 wherein said compound is 1,2,6 - trimethyl - 4 - (4' - nitro-3'-hydroxyphenyl) - 1,4 - dihydropyridine - 3,5 - dicarboxylic acid diethyl ester.

29. A composition according to claim 1 wherein said compound is 1,2,6 - trimethyl - 4 - ($\alpha$ - pyridyl)-1,4-dihydropyridine - 3,5 - dicarboxylic acid dimethyl ester.

30. A composition according to claim 1 wherein said compound is 1,2,6 - trimethyl - 4 - ($\alpha$ - pyridyl)-1,4-dihydropyridine - 3,5 - dicarboxylic acid diethyl ester.

31. A composition according to claim 1 wherein said compound is 1,2,6 - trimethyl - 4 -($\beta$ - pyridyl) - 1,4-dihydropyridine - 3,5 - dicarboxylic acid dimethyl ester.

32. A composition according to claim 1 wherein said compounds N - isopropyl - 2,6 - dimethyl - 4-($\alpha$-pyridyl)-1,4 - dihydropyridine - 3,5 - dicarboxylic acid dimethyl ester.

33. A composition according to claim 1 wherein said compound is N - allyl - 2,6 - dimethyl - 4 - ($\alpha$-pyridyl)-1,4 - dihydropyridine - 3,5 - dicarboxylic acid dimethyl ester.

34. A composition according to claim 1 wherein said compound is 1,2,6 - trimethyl - 4 - ($\alpha$-pyridyl)-1,4-dihydropyridine - 3,5 - dicarboxylic acid diisopropyl ester.

35. A composition according to claim 1 wherein said compound is 1,2,6 - trimethyl - 4 - ($\alpha$ - pyridyl)-1,4-dihydropyridine - 3,5 - dicarboxylic acid di-($\beta$-methoxy-ethyl-ester).

36. A composition according to claim 1 wherein said compound is 1,2,6 - trimethyl - 4 - ($\beta$-pyridyl)-1,4-dihydropyridine - 3,5 - dicarboxylic acid di-($\beta$-propoxy-ethyl-ester).

37. A composition according to claim 1 wherein said compound is 1,2,6 - trimethyl - 4 - ($\alpha$ - pyridyl)-1,4-dihydropyridine - 3,5 - dicarboxylic acid di-($\beta$-propoxy-ethyl-ester).

38. The method of effecting dilation of the coronary arteries which comprises administering to an animal in need thereof an effective amount of a compound of the formula:

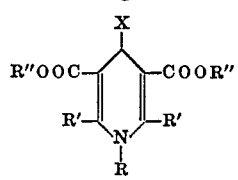

in which
R is a branched or straight-chain alkyl with 1 to 3 carbon atoms, or such alkyl having a double or triple bond or substituted by hydroxy or alkoxy, benzyl, or benzyl substituted in the nucleus by one or more of the substituents halogen, alkyl, alkoxy;
R' is hydrogen or branched or straight-chain alkyl with 1 to 3 carbon atoms;
R" is branched or straight-chain, saturated alkyl with with 1 to 4 carbon atoms, or such alkyl interrupted by oxygen or substituted by hydroxyl; and
X is phenyl substituted by at least one nitro or amino group or further substituted by halogen, alkyl, alkoxy or hydroxy, or $\alpha$-, $\beta$- or $\gamma$-pyridyl,
and a pharmaceutical carrier.

References Cited
UNITED STATES PATENTS

| | | | |
|---|---|---|---|
| 3,485,847 | 12/1969 | Bossert et al. | 260—295.5 |
| 3,488,359 | 11/1970 | Bossert et al. | 260—295.5 |
| 3,441,648 | 4/1969 | Loev et al. | 260—295.5 |
| 3,511,847 | 5/1970 | Loev et al. | 260—295.5 |

STANLEY J. FRIEDMAN, Primary Examiner